US011601179B1

(12) United States Patent
Dunn et al.

(10) Patent No.: US 11,601,179 B1
(45) Date of Patent: Mar. 7, 2023

(54) COORDINATED BEAMFORMING OF NODES IN A WIRELESS MESH NETWORK

(71) Applicant: Meta Platforms, Inc., Menlo Park, CA (US)

(72) Inventors: Brian Dunn, Menlo Park, CA (US); Krishna Srikanth Gomadam, San Jose, CA (US); Djordje Tujkovic, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/567,203

(22) Filed: Jan. 3, 2022

Related U.S. Application Data

(63) Continuation of application No. 16/877,857, filed on May 19, 2020, now Pat. No. 11,251,850.

(51) Int. Cl.
*H04B 7/06* (2006.01)
*H04B 17/336* (2015.01)
*H04B 7/08* (2006.01)

(52) U.S. Cl.
CPC ......... *H04B 7/0626* (2013.01); *H04B 7/0617* (2013.01); *H04B 7/0857* (2013.01); *H04B 17/336* (2015.01)

(58) Field of Classification Search
CPC .................. H04W 28/0289; H04W 16/02
See application file for complete search history.

(56) References Cited

U.S. PATENT DOCUMENTS

| | | | |
|---|---|---|---|
| 9,628,999 | B2 | 4/2017 | Aboul-Magd et al. |
| 2002/0027957 | A1 | 3/2002 | Paulraj et al. |
| 2012/0122502 | A1 | 5/2012 | Shin et al. |
| 2012/0236736 | A1 | 9/2012 | Frank et al. |
| 2013/0250885 | A1 | 9/2013 | Davydov et al. |
| 2016/0037431 | A1 | 2/2016 | Kohli |
| 2016/0226563 | A1 | 8/2016 | Kohli |
| 2016/0226569 | A1 | 8/2016 | Kohli |

*Primary Examiner* — Minh Trang T Nguyen
(74) *Attorney, Agent, or Firm* — BakerHostetler (57) ABSTRACT

Apparatuses, methods, and systems for coordinated beamforming in a wireless mesh network, are disclosed. One system includes a network that includes a plurality of nodes connected through wireless links, and a controller. The wireless links including aggressor links and victim links wherein the aggressor links interfere with the victim links. The controller is operative to identify aggressor links and victim links of a group of nodes of the plurality of nodes, coordinate beam scans of the one or more victim receive nodes associated with the victim links of the group, coordinate transmission of one or more aggressor transmit nodes associated with the aggressor links of the group, characterize or receive characterizations of measured interference at the one or more victim receive nodes during the coordinated beam scans, and select beamforming coefficients for the victim receive nodes based at least on the characterizations of the measured interference.

18 Claims, 9 Drawing Sheets

Identifying aggressor links and victim links of a group of nodes of a plurality of nodes, wherein the plurality of nodes are connected through wireless links, the wireless links including the aggressor links and the victim links, wherein the aggressor links interfere with the victim links
710

Coordinating beam scans of aggressor transmitter nodes associated with the aggressor links
720

Coordinating reception of one or more victim receive nodes associated with the victim links
730

Characterizing or receiving characterizations of measured interference at the one or more victim receive nodes during the coordinated beam scans
740

Selecting beam forming coefficients for the aggressor transmitter nodes based at least on the characterizations of the measured interference
750

FIGURE 7

Identifying aggressor links and victim links of a group of nodes of a plurality of nodes, wherein the plurality of nodes are connected through wireless links, the wireless links including the aggressor links and the victim links, wherein the aggressor links interfere with the victim links
810

Coordinating beam scans of victim nodes associated with the victim links
820

Coordinating transmission of one or more aggressor transmit nodes associated with the aggressor links
830

Characterizing or receiving characterizations of measured interference at the one or more victim receive nodes during the coordinated beam scans
840

Selecting beamforming coefficients for the victim receive nodes based at least on the characterizations of the measured interference
850

COORDINATED BEAMFORMING OF NODES IN A WIRELESS MESH NETWORK

RELATED PATENT APPLICATIONS

This patent application is a continuation of U.S. patent application Ser. No. 16/877,857, filed May 19, 2020, which is herein incorporated by reference.

FIELD OF THE DESCRIBED EMBODIMENTS

The described embodiments relate generally to wireless communications. More particularly, the described embodiments relate to systems, methods and apparatuses for coordinated beamforming in a wireless mesh network.

BACKGROUND

Wireless mesh networks include a collection of wireless nodes that connect and wirelessly communicate with each other. The nodes are proximately located, and accordingly, at least some of wireless links between the wireless nodes suffer from interference due to wireless communication of other wireless links. In a wireless mesh network where multiple point-to-point links transmit and receive simultaneously, interference between links can degrade the performance of the wireless mesh network.

It is desirable to have methods, apparatuses, and systems for coordinated beamforming in a wireless mesh network.

SUMMARY

An embodiment includes a network. The network includes a plurality of nodes connected through wireless links, and a controller. The wireless links including aggressor links and victim links wherein the aggressor links interfere with the victim links. The controller is operative to identify aggressor links and victim links of a group of nodes of the plurality of nodes, coordinate transmit beam scans of aggressor transmitter nodes associated with the aggressor links, coordinate reception of one or more victim receive nodes associated with the victim links during the coordinated transmit beam scans, coordinate receive beam scans of the one or more victim receive nodes associated with the victim links of the group, coordinate transmission of one or more aggressor transmit nodes associated with the aggressor links of the group during the coordinated receive beam scans, characterize or receive characterizations of measured interference at the one or more victim receive nodes during the coordinated transmit and receive beam scans, and select beamforming coefficients for the aggressor transmit nodes and the victim receive nodes based at least on the characterizations of the measured interference.

Another embodiment includes a method. The method includes identifying aggressor links and victim links of a group of nodes of a plurality of nodes, wherein the plurality of nodes are connected through wireless links, the wireless links including the aggressor links and the victim links, wherein the aggressor links interfere with the victim links, coordinating transmit beam scans of aggressor transmitter nodes associated with the aggressor links, coordinating reception of one or more victim receive nodes associated with the victim links during the coordinated transmit beam scans, coordinating receive beam scans of victim nodes associated with the victim links, coordinating transmission of one or more aggressor transmit nodes associated with the aggressor links during the coordinated receive beam scans, characterizing or receiving characterizations of measured interference at the one or more victim receive nodes during the coordinated transmit and receive beam scans, and selecting beamforming coefficients for the aggressor transmit nodes and the victim receive nodes based at least on the characterizations of the measured interference.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for coordinated beamforming of multiple antenna nodes in a wireless mesh network. When multiple antennas are present at transmitting nodes, receiving nodes, or both, beamforming techniques can be used to control the direction at which wireless signals are transmitted and/or received by the nodes to improve a communication path or suppress interference. Radio frequency signals transmitted by each of the antennas can be selectively scaled and/or delayed (by, for example, phase shifters) by beamforming techniques in order to direct the main lobe (that is, the bulk of the transmitted signal power for a transmitting node) in a desired direction. Similarly, signals received by the antennas can be scaled and/or delayed and summed using beamforming techniques to change the effective listening direction (the bulk of the received signal power) of the receiver.

Beamforming techniques can also be used for interference suppression. For example, by selectively scaling and/or delaying signals for certain antenna elements to suppress the array response in the direction of interference at either the transmitter or receiver (e.g. create a "null" in the array response). However, because the array response null location and depth is highly sensitive to errors in per-element scaling and delay (e.g. due to quantized phase/gain resolution and part-to-part/element-to-element variation), it is difficult to compute the optimal beam offline (that is, theoretically compute without actual testing and measurement of responses). Generally, the calculated array pattern won't match the actual array pattern with sufficient precision to predict exactly where nulls in the array response occur.

At least some of the described embodiments overcome the limitations of merely calculating beamforming patterns. At least some embodiments include coordinated beamforming (CBF) whereby multiple links are coordinated to take array response measurements for a set of candidate beams (beamforming patterns) and the resulting measurements are used to select the best beam for the given scenario. For example, to suppress interference where it is most advantageous for the overall network performance.

At least some embodiments include coordinated beamforming in a wireless mesh network to adjust the array responses (beamforming patterns) of transmitters and receivers to reduce or eliminate interference to/from other links in the network. An embodiment includes running interference measurement scans across the network to quantify cross-link coupling between each link for each geometric beamforming antenna array and for the beams currently being used by each sector of each node for data transmission. Further, interference measurements (IM) results are processed and instances of cross-link interference in the network or identified, including angles of interference when possible. Further, coordinated beamforming scans for links that cause or receive interference are scheduled so that multiple CBF (coordinated beamforming) scans can run in parallel across the network without interfering with each other. Further, CBF scans are performed as scheduled at each node, including generating and measuring candidate beamforming weight vectors that suppress the array response in certain directions. Finally, interference measurements taken during CBF scans are aggregated, beamforming patterns are selected for each link, and nodes are instructed to use the selected beamforming patterns.

Figure 1:
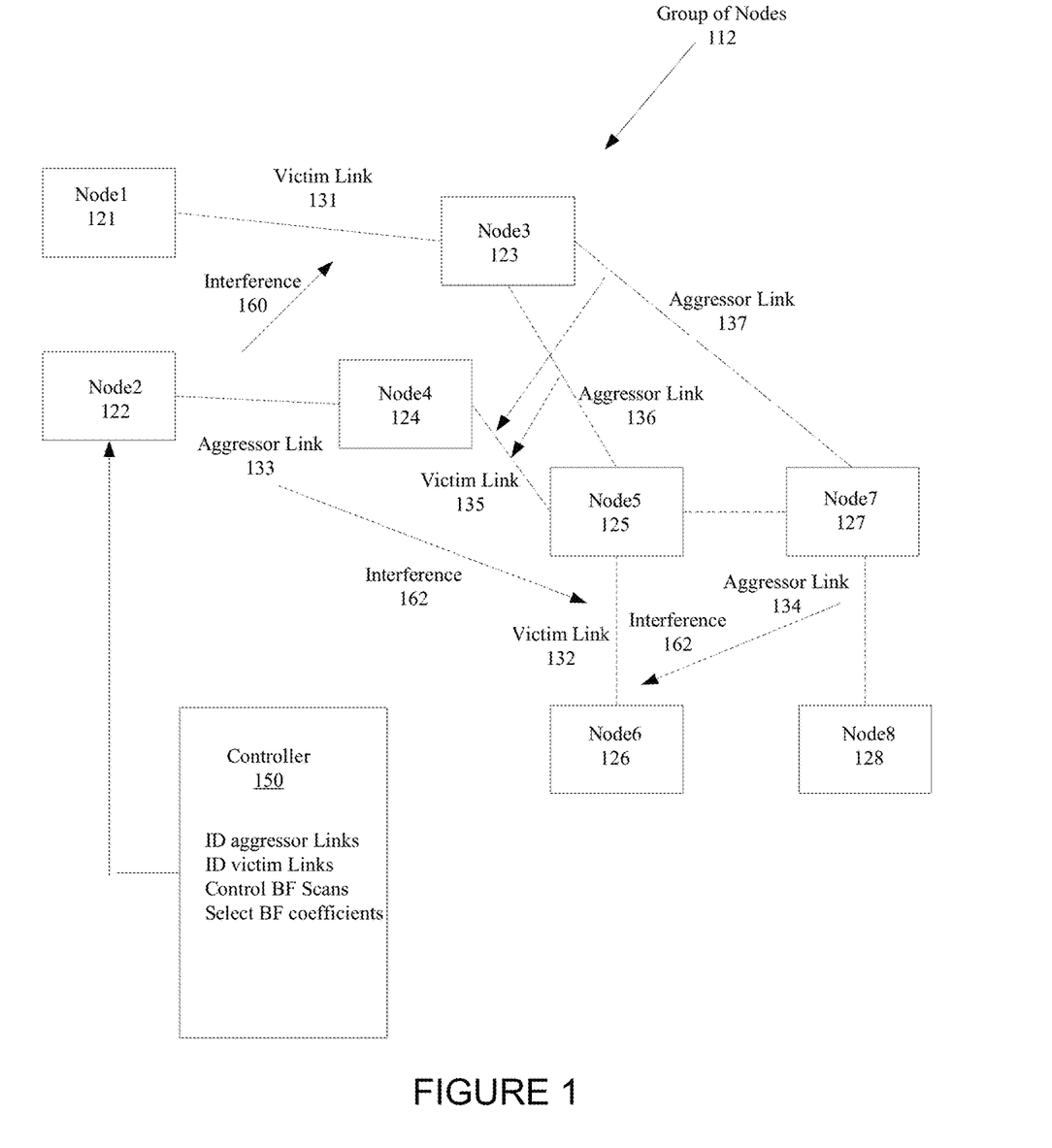
FIG. 1 shows a wireless mesh network that includes a group of nodes that include aggressor wireless links and victim wireless links, according to an embodiment.

FIG. 1 shows a wireless mesh network that includes a group 112 of nodes 121, 122, 123, 124, 125, 126, 127, 128 that include aggressor 133, 134, 136, 137 wireless links and victim wireless links 131, 132, 135, according to an embodiment. For an embodiment, the nodes wirelessly communicated with each other through wireless links. Each node may additionally communicate with client devices (not shown) that connect to the nodes to obtain, for example, access to the internet.

The proximity of the nodes with each other can cause wireless communication through the wireless links between the nodes to suffer from interference. That is, wireless communication through one link can cause wireless interference with wireless communication of another link. Here, wireless links that cause interference are termed aggressor wireless links, and wireless links that suffer from interference due to one or more of the aggressor wireless links are termed victim wireless links.

As shown, for example, the wireless link 133 between node 122 and node 124 is an aggressor wireless link 133 that causes interference 160 with victim link 131 between node 121 and node 123. That is, the wireless communication from node 122 to the node 124 through the aggressor wireless link 133 interferes (interference 160) with the wireless communication from node 121 to node 123 through the victim wireless link 131.

FIG. 1 also shows the multiple aggressor links can interfere with a victim link. For example, the wireless link 133 between node 122 and node 124 is an aggressor wireless link 133, and the wireless link 134 between node 127 and node 128 is an aggressor wireless link 134, that both causes interference 162 with victim link 132 between node 125 and node 126. That is, the wireless communication from node 122 to the node 124 through the aggressor wireless link 133, and the wireless communication from node 127 to the node 128 through the aggressor wireless link 134 interfere (interference 162) with the wireless communication from node 125 to node 126 through the victim wireless link 132.

FIG. 1 also shows the multiple aggressor links originating from a single node 123 can interfere with a victim link 135. For example, the wireless link 136 between node 123 and node 125 is an aggressor wireless link 136, and the wireless link 137 between node 123 and node 127 is an aggressor wireless link 137, that both causes interference with victim link 135 between node 124 and node 125. That is, the wireless communication from node 123 to the node 125 through the aggressor wireless link 136, and the wireless communication from node 123 to the node 127 through the aggressor wireless link 137 interfere with the wireless communication from node 124 to node 125 through the victim wireless link 135.

While not depicted, it is to be understood that which links are identified as aggressor links and victim links can be communication direction dependent. That is, a link may be an aggressor link when a node of the link to transmitting wireless signals, but may be a victim link when the node is receiving wireless signals. Further, which links are identified as aggressor links and victim links can be time dependent. That is, for example, the aggressor link 136 may interfere with the victim link 136 at a first period of time, and the aggressor link 137 may interfere with the victim link 136 at a second period of time.

FIG. 1 also includes a controller 150. For at least some embodiments, the controller 150 maintains a communication path with each of the nodes 121-128 of the wireless mesh network. The communication path can be either a direct connection, or a connection through other node(s) of the wireless mesh network.

For at least some embodiments, the controller is operative to identify the aggressor links and the victim links of a group of nodes of the plurality of nodes, coordinate beam scans of aggressor transmitter nodes associated with the aggressor links, coordinate reception of one or more victim receive nodes associated with the victim links, characterize or receive characterizations of measured interference at the one or more victim receive nodes during the coordinated beam scans, and select beamforming coefficients for the aggressor transmitter nodes based at least on the characterizations of the measured interference.

For an embodiment, a bean scan, or beam scans, refers to a switching through multiple beamforming patterns of the node (transmitting or receiving). As described, the scan can occur at an aggressor transmitting node or at a victim receiving node. For an embodiment, while the scan is occurring (the switching of the beamforming patterns) a receiving node measures interference time coordinated with the changes in the beamforming patterns. This allows for a characterization of how effective the different beamforming patterns are in mitigating interference between aggressor links and victim links.

Identifying Aggressor Links and Victim Links.

Figure 2:
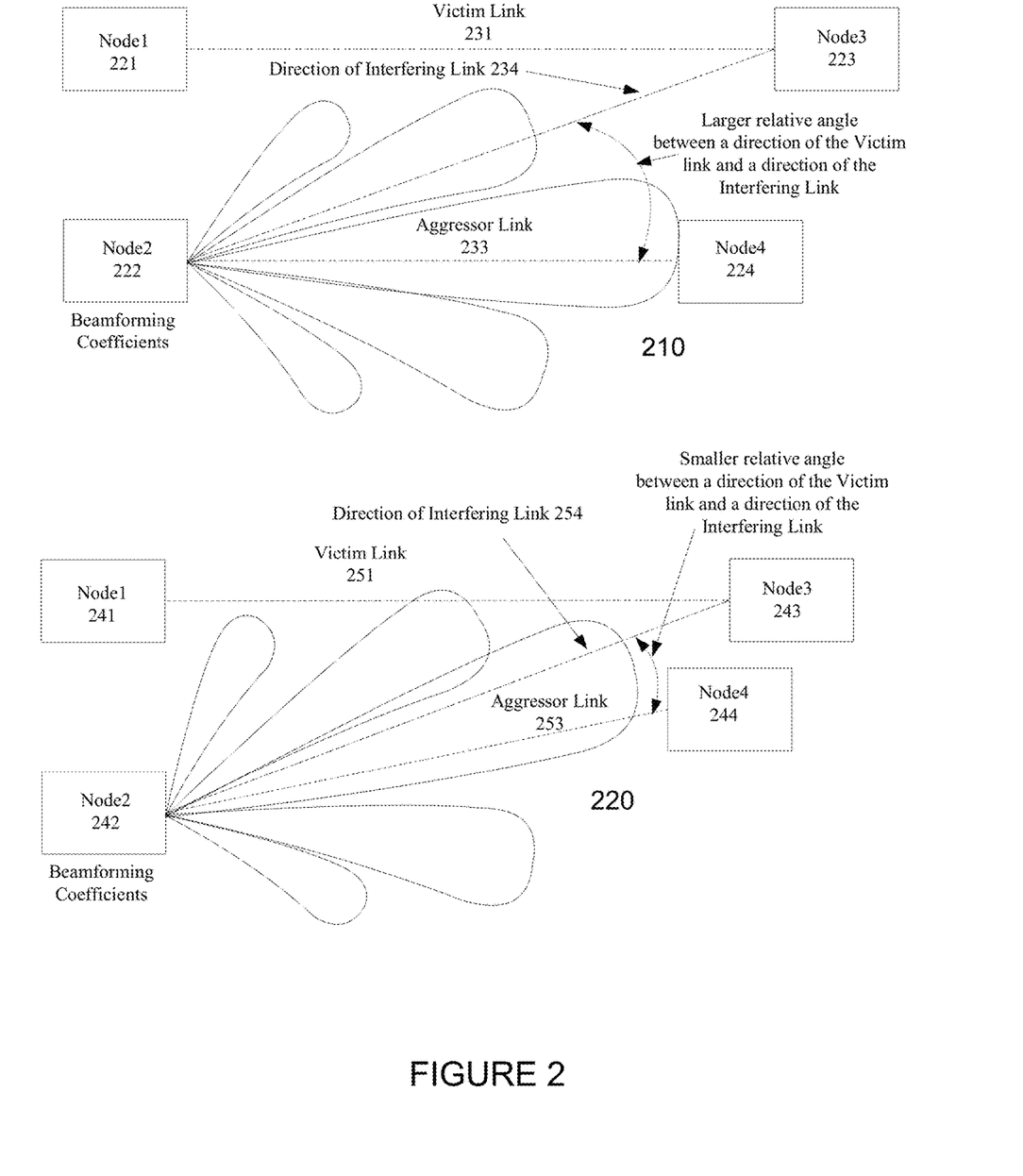
FIG. 2 shows exemplary beamforming patterns for different beamforming coefficients of a transmitting node, and a possible effect on a victim wireless link, according to an embodiment.

For at least some embodiments, aggressor links and victim links are identified by relative angles between link directions between nodes and known characteristics of the beamforming patterns. That is, the majority of energy propagating from one node to another node through a link is contained within the main lobe of the beamforming pattern. Accordingly, the smaller the angle between the direction of an aggressor link and a direction of an interfering link between the aggressor transmitting node of the aggressor link and a victim receiving node of a victim link, generally the less the interference between the aggressor link and the victim link. FIG. 2 shows node configurations that have different relative angles between links, according to an embodiment. A first node configuration 210 includes an aggressor link 233 between a transmitting aggressor node 222 and a receiving aggressor node 224 node that has a larger angle (that is, larger than a second node configuration 220) between a direction of the aggressor link 233 and a direction of an interfering link 234 between the transmitting aggressor node 222 and a receiving victim node 223. A corresponding victim link 231 is between a transmitting victim node 221 and the receiving victim node 223. As mentioned, and as shown, the majority of the signal energy is contained within the main lobe of a beamforming pattern, and accordingly, the larger the angle between the direction of the links (such as, aggressor link 233 and interfering link 234), the smaller the interference between the aggressor link 233 and the victim link 231. The second node configuration 220 includes an aggressor link 253 between a transmitting aggressor node 242 and a receiving aggressor 244 node that has a smaller angle (that is, smaller than the first node configuration 210) between a direction of the aggressor link 253 and a direction of an interfering link 254 between the transmitting aggressor node 242 and a receiving victim node 243. A corresponding victim link 251 is between a transmitting victim node 241 and the receiving victim node 243. As mentioned, and as shown, the majority of the signal energy is contained within the main lobe of a beamforming pattern, and accordingly, the smaller the angle between the direction of the links (such as, aggressor link 253 and interfering link 254), the larger the interference between the aggressor link 253 and the victim link 251. Accordingly, at least some embodiments include identifying aggressor links and victim links based at least on a relative angular relationship between the directions of the links. For at least some embodiments, the locations of the nodes are fixed. Further, the locations are known. Therefore, the relative angular relationships between the different nodes can be determined by knowing which nodes are communicating with each other. While the interfering links of FIG. 2 are depicted as line-of-sight (LOS) links, it is to be understood that the interfering links may in reality be reflective links.

For at least some embodiments, the aggressor links and the victim links are identified by interference measurements. For an embodiment, an interferences measurement scan indicates the victim link is subject to interference power from the aggressor link (INR) above a threshold. For at least some embodiments, the INR estimate is based on an aggressor nodes maximum transmit power, average transmit power, or a certain percentile; where statistics are derived from real data collected historically, or result of modelling network dynamics of power control based on cross-link coupling as measured during interference measurement scans and coordinated beamforming scans as described.

Coordinating Beam Scans of Transmitting Nodes

For at least some embodiments, beam scans are coordinated by timing transmission from an aggressor node of an identified aggressor wireless link. The coordination includes selecting beamforming settings that generate varying beamforming patterns. A scan includes sequentially switching through the different beamforming patterns while the aggressor transmitting node is transmitting wireless signals to a receiving node of the aggressor wireless link. An embodiment includes cycling through each possible beamforming setting.

Figure 9:
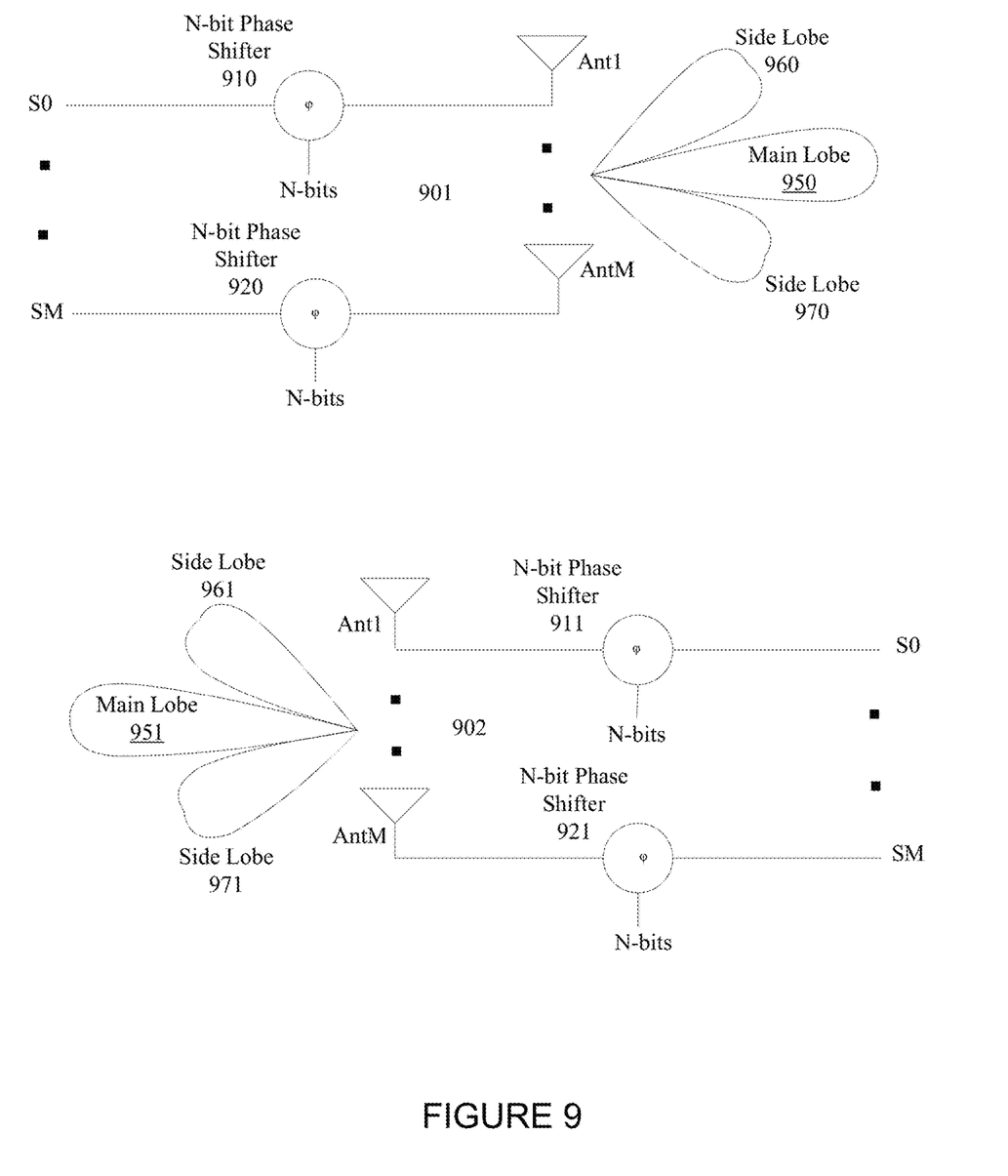
FIG. 9 shows an antenna array for a transmitting node, an antenna array for a receiving node, and further shows phase shifters associated with each of the antenna elements of the antenna arrays, according to an embodiment.

For at least some embodiments, there are at least a couple of different possible orderings of the beam scans. A first ordering includes an ordering of beamforming patterns of a single transmitting aggressor node. The ordering of the beamforming patterns may be selected based upon a likelihood the beamforming pattern will satisfy a desired interference level (that is, the interference below a desired threshold). The ordering may be defined based on the methods used for generating patterns as shown in FIG. 9. A second ordering includes an ordering of which transmitting aggressor nodes of a plurality of transmitting aggressor nodes is performing a scan of beamforming patterns. For a group of nodes that include multiple aggressor links, the order of the beamforming scanning can be selected based on a perceived level of importance of the links. For an embodiment, the ordering is selected based on the level of interference that the aggressor link generates. That is, the ordering of the beamforming scans can be from the strongest to weakest interference. For an embodiment, the ordering of the scanning is based on QoS (quality of service) requirements of victim links. That is, different victim links may have different QoS requirements, and the ordering of the scanning of the beamforming patterns of the different aggressor transmitting nodes may be selected based on the level of QoS of the corresponding victim links. For an embodiment, different QoS links have different target INR(s). For an embodiment, the targets of the different INR(s) for different links is based on the importance of those links in the network. For an embodiment, the importance of the links, and therefore the target INR(s) is based on how many downstream nodes the victim link supports. That is, within a wireless mesh network, different links will naturally support more downstream wireless nodes. The more downstream nodes there are, the more important the link.

Coordinating Reception of Victim Receive Nodes

For at least some embodiments, wireless reception of a receiving node of an identified victim link (that is, the victim link that is being interfered with by the identified aggressor wireless link) is coordinated so that interference caused by wireless signals transmitted through each of the scanned beamforming settings of the aggressor node can be measured. The interference can be measured with or without the victim transmitting node transmitting wireless signals.

An embodiment includes the victim receive node measuring an interference-to-noise ratio (INR) while the aggressor transmit node is scanning through a set of beams. That is, the victim transmit node is not transmitting. For an embodiment, a signal to noise plus interference ratio (SINR) is determined based on the interference-to-noise ratio (INR).

An embodiment further includes coordinating transmission by the victim transmit node (that is associated with the same victim link and the victim receive node) while the aggressor transmitter node is scanning. For an embodiment, the victim receive node measures a signal to noise plus interference ratio (SINR). That is, the received wireless signal from the victim transmitting node is the desired signal, and the signal power received from the aggressor transmitting node is the interference.

For an embodiment, multiple victim transmit nodes are transmitting to the victim receiving node. That is, an embodiment includes coordinating transmission by a plurality of victim transmit nodes while the aggressor transmitter node is scanning, and the victim receive node measures a signal to noise plus interference ratio (SINR). This can include the plurality of victim transmitting node each transmitting to the same victim receiving node, or this can include one or more victim receive nodes receiving from the multiple victim transmitting nodes.

Characterizing Measured Interference

For at least some embodiments, the controller 150 receives the interference measurements (INR, SINR) for the different beamforming settings of the scan of the aggressor transmit node. For an embodiment, beamforming patterns are selected for node base on the characterized measured interference.

Selecting Beamforming Coefficients of Transmitting Node

For at least some embodiments, beamforming coefficients for the aggressor transmitter node are selected based on a measured SINR of the victim receive node. That is, the beamforming coefficients for the aggressor transmitter node are selected only based on the measured interference and signal power at the victim receive node.

For at least some embodiments, beamforming coefficients for the aggressor transmitter node are selected based the measured SNR of the aggressor receive node. That is, the beamforming coefficients for the aggressor transmitter node are selected only based on the received signal strength of the signal at the aggressor receive node.

For at least some embodiments, beamforming coefficients for the aggressor transmitter nodes are selected based on a measured SINR of the victim receive node and a measured SNR of the receive node. That is, the beamforming coefficients for the aggressor transmitter node are selected base on at least both the measured interference and signal power at the victim receive node and the received signal strength of the signal at the aggressor receive node.

Coordinating Beam Scans of Receiving Node

For at least some embodiments, beam scans are coordinated by timing reception by a victim node of an identified victim wireless link. The coordination includes selecting beamforming settings that generated varying beamforming patterns. A scan includes sequentially switching through the different beamforming patterns while the victim receiving node is receiving wireless signals from a transmitting node of the victim wireless link.

Coordinating Transmission of Aggressor Transmit Nodes

For at least some embodiments, wireless transmission of a transmitting node of an identified aggressor link (that is, the aggressor link that is causing interference with the identified victim wireless link) is coordinated so that interference suffered by wireless signals received through each of the scanned beamforming settings of the victim node can be measured. The interference can be measured with or without the victim transmitting node transmitting wireless signals.

An embodiment includes the victim receive node measuring an interference-to-noise ratio (INR) while the victim receive node is scanning through a set of beams. That is, the victim transmit node is not transmitting. For an embodiment, a signal to noise plus interference ratio (SINR) is determined based on the interference-to-noise ratio (INR).

An embodiment further includes coordinating transmission by the victim transmit node (that is associated with the same victim link and the victim receive node) while the victim receive node is scanning. For an embodiment, the victim receive node measures a signal to noise plus interference ratio (SINR). That is, the received wireless signal from the victim transmitting node is the desired signal, and the signal power received from the aggressor transmitting node is the interference.

For an embodiment, multiple victim transmit nodes can be transmitting to the victim receiving node. That is, an embodiment includes coordinating transmission by a plurality of victim transmit nodes while the aggressor transmitter node is scanning, and the victim receive nodes measures a signal to noise plus interference ratio (SINR).

Characterizing Measured Interference

For at least some embodiments, the controller 150 receives the interference measurements (INR, SINR) for the different beamforming settings of the scan of the victim receive node. For an embodiment, the controller 150 selected beamforming patterns for nodes based on the characterized interference measurements.

Selecting Beamforming Coefficients of Receiving Node

For at least some embodiments, beamforming coefficients for the victim receiver node are selected based on a measured SINR of the victim receive node. That is, the beamforming coefficients for the victim receiver node are selected only based on the measured interference and signal power at the victim receive node.

For at least some embodiments, beamforming coefficients for the victim receiver are selected based the measured SNR of the victim receiver node. That is, the beamforming coefficients for the victim receiver node are selected only based on the received signal strength of the signal at the victim receiver node.

Figure 3:
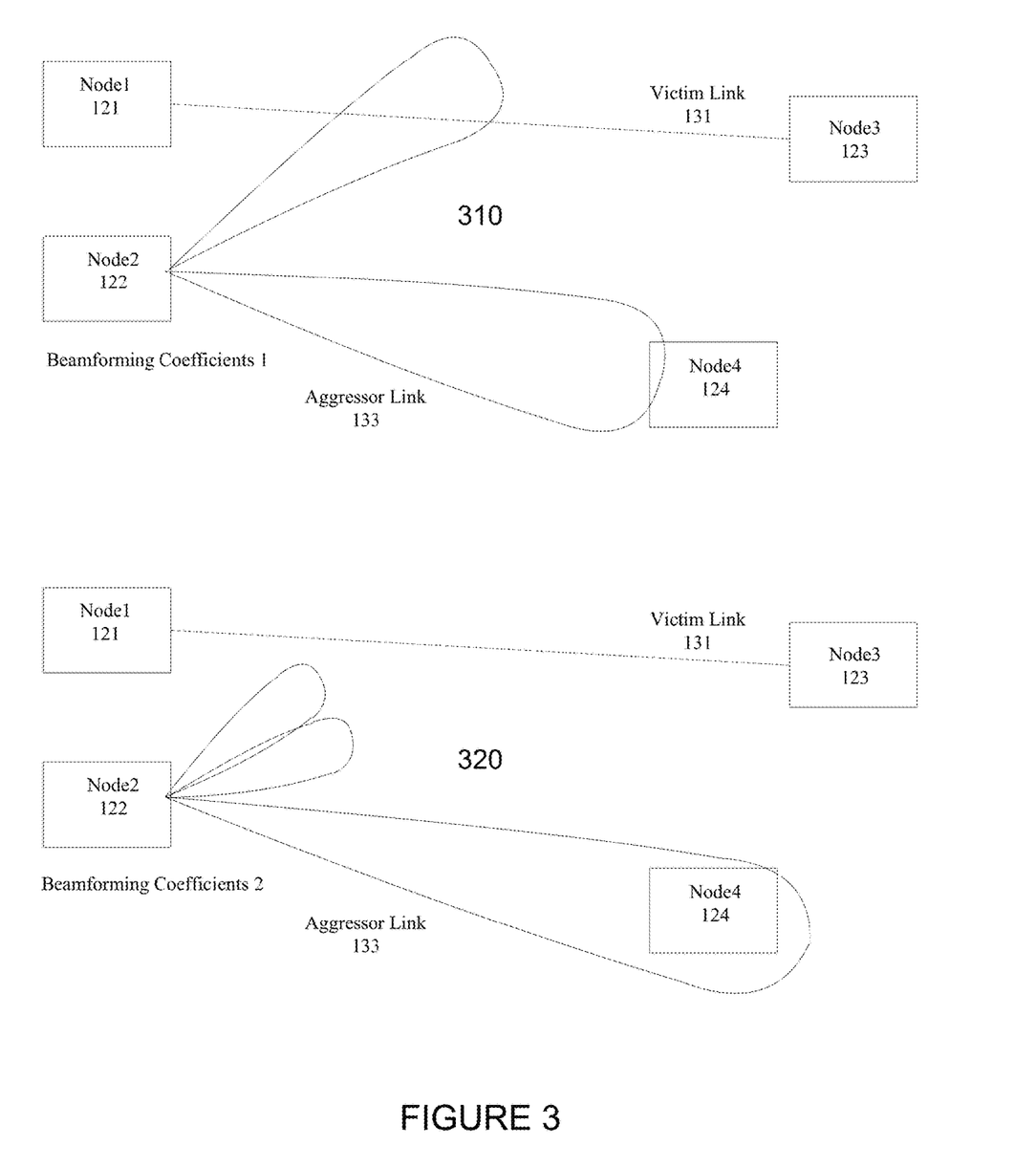
FIG. 3 shows node configurations that have different relative angles between links, according to an embodiment.

FIG. 3 shows exemplary beamforming patterns 310, 320 for different beamforming coefficients of a transmitting node 122, and a possible effect on a victim wireless link 131, according to an embodiment. As shown, first beamforming coefficients for a first beamforming pattern 310 forms lobes, wherein a main lobe is directed along an aggressor link 133 from the aggressor transmitting node 122 to the aggressor receiving node 124. A secondary lobe of the first beamforming pattern 310 is directed to the victim link 131 between the victim transmitting node 121 and the victim receiving node 123. This secondary lobe can cause undesired signal interference of wireless communication through the victim link 131.

Further, as shown, second beamforming coefficients for a second beamforming pattern 320 forms lobes, wherein a main lobe is directed from the aggressor transmitting node 122 to the aggressor receiving node 124. Secondary lobes of the second beamforming pattern 310 are not as strongly directed to the victim link 131 between the victim transmitting node 121 and the victim receiving node 123 as the secondary lobe of the first beamforming pattern. Accordingly, this secondary beamforming pattern causes less undesired signal interference of wireless communication through the victim link 131 than the first beamforming pattern 310.

Scanning through the first beamforming pattern 310 and the second beamforming pattern 320, and characterizing interference at the victim receiving node would lead to the selection of the second beamforming pattern for communication between the aggressor transmitting node 122 and the aggressor receiving node 124. Selection of the second beamforming pattern 320 makes the interference with the victim link 131 to be less than if the first beamforming pattern 210 were selected.

Figure 4:
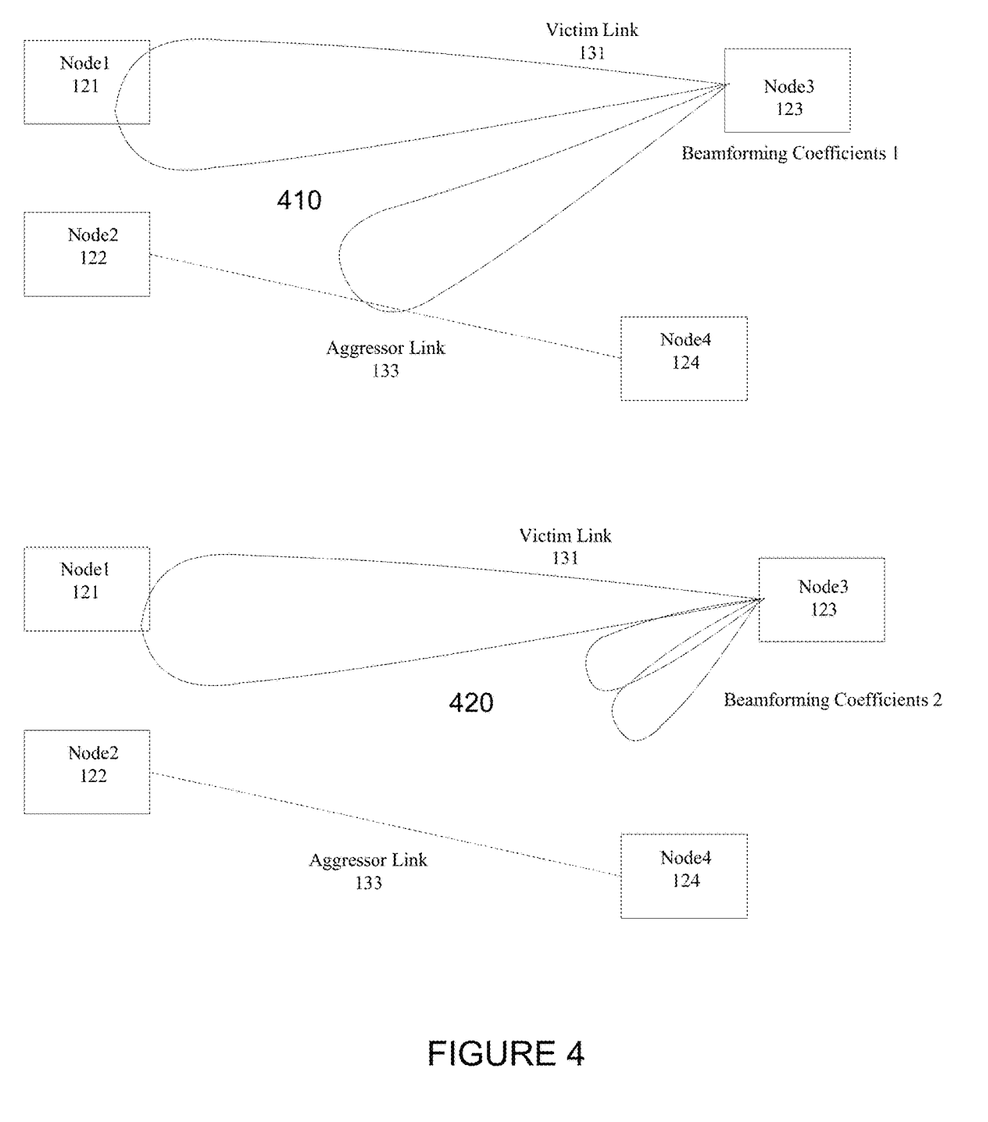
FIG. 4 shows exemplary beamforming patterns for different beamforming coefficients of a receiving node, and a possible effect on a victim wireless link, according to an embodiment.

FIG. 4 shows exemplary beamforming patterns 410, 420 for different beamforming coefficients of a receiving node 123, and a possible effect on a victim wireless link 131, according to an embodiment. As shown, first beamforming coefficients for a first beamforming pattern 410 forms lobes, wherein a main lobe is directed along an aggressor link 133 from the victim receiving node 123 to the victim transmitting node 121. A secondary lobe of the first beamforming pattern 310 is directed to the aggressor link 133 between the aggressor transmitting node 122 and the aggressor receiving node 124. This secondary lobe can cause undesired signal interference of wireless communication through the victim link 131.

Further, as shown, second beamforming coefficients for a second beamforming pattern 420 forms lobes, wherein a main lobe is directed from the victim receiving node 123 to the victim transmitting node 121. Secondary lobes of the second beamforming pattern 410 are not as strongly directed to the aggressor link 133 between the aggressor transmitting node 122 and the aggressor receiving node 124 as the secondary lobe of the first beamforming pattern 410. Accordingly, this secondary beamforming pattern causes less undesired signal interference of wireless communication through the victim link 131 than the first beamforming pattern.

Scanning through the first beamforming pattern 410 and the second beamforming pattern 420, and characterizing interference at the victim receiving node would lead to the selection of the second beamforming pattern 420 for communication between the victim transmitting node 121 and the victim receiving node 123. Selection of the second beamforming pattern 420 makes the interference with the victim link 131 to be less than if the first beamforming pattern 410 were selected.

Figure 5:
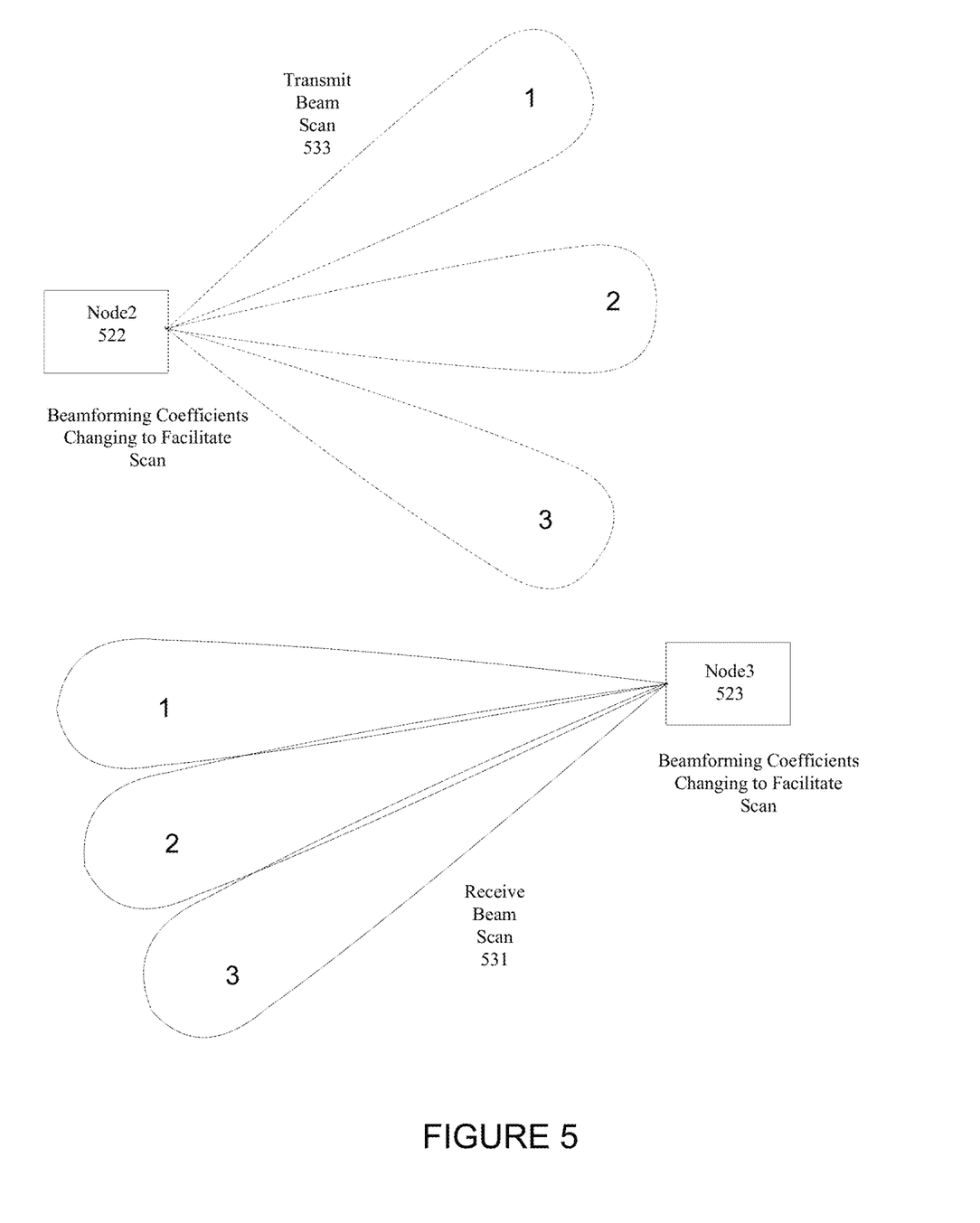
FIG. 5 shows a scanning through a set of beam settings at a transmitting node and at a receiving node, according to an embodiment.

FIG. 5 shows a scanning through a set of beam settings (1, 2, 3) at a transmitting node and at a receiving node, according to an embodiment. As shown, a transmitting node 522 scans through three possible beamforming patterns (1, 2, 3) when performing a transmit beam scan 533. The beamforming patterns are selected by selecting beamforming coefficients that result in the formation of a corresponding beamforming pattern. For an embodiment, the transmitting node 522 is associated with an aggressor wireless link which is causing interference with wireless communication through a victim wireless link. Accordingly, during the scanning through the different beamforming patterns (1, 2, 3) interference received at the victim receiving node is measured. For an embodiment, one of the different beamforming patterns (1, 2, 3) is selected based on the measured and characterized interference.

Further, as shown, a receiving node 523 scans through three possible beamforming patterns (1, 2, 3) when performing a receive beam scan 531. The beamforming patterns are selected by selecting beamforming coefficients that result in the formation of a corresponding beamforming pattern. For an embodiment, the receiving node 523 is associated with a victim wireless link which is receiving interference from wireless communication through aggressor wireless link. Accordingly, during the scanning through the different beamforming patterns (1, 2, 3) interference received at the victim receiving node is measured. For an embodiment, one of the different beamforming patterns (1, 2, 3) is selected based on the measured and characterized interference.

Figure 6:
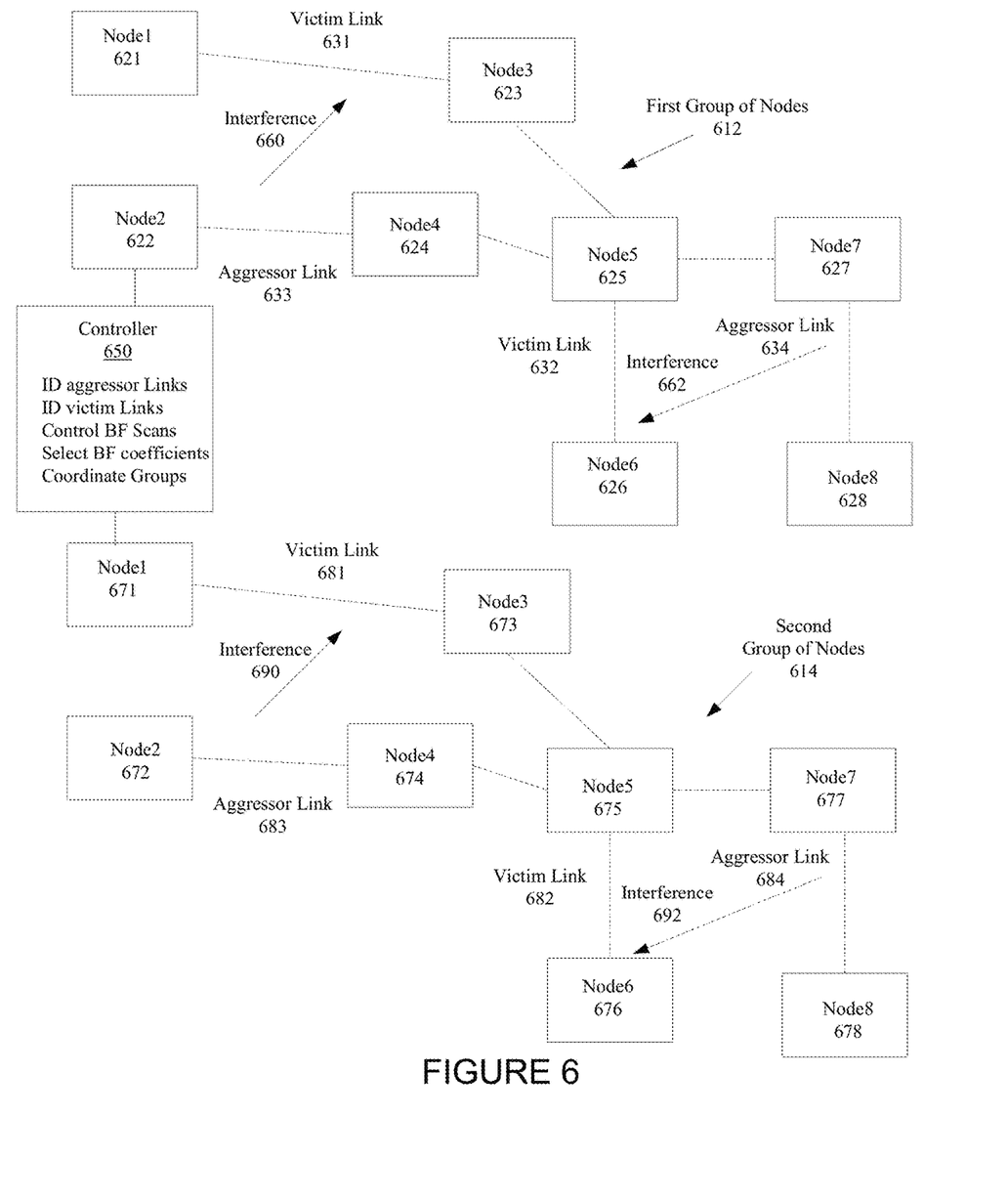
FIG. 6 shows a wireless mesh network that includes a plurality of groups of nodes that include aggressor wireless links and victim wireless links, according to an embodiment.

FIG. 6 shows a wireless mesh network that includes a plurality of groups 612, 614 of nodes that include aggressor wireless links and victim wireless links, according to an embodiment. For an embodiment, each of the groups of nodes performs beam pattern scanning of selected nodes within the groups 612, 614.

For an embodiment, the different groups 612, 614 are selected by a proximity of the nodes relative to each other. For at least some embodiments, the different groups are selected so the beamforming scans can be performed by the different groups without the beamforming scans of one group interfering (wherein without interfering can be determined by a measured interference being below a threshold) with the beamforming scan of the other group. For at least some embodiments, the different groups adaptively change over time, as long as the interference between the groups allows for simultaneous beamforming scanning of the different groups. A node may be member of one group at one point in time, but then be a member of a different group at a different point in time.

By breaking the nodes of the wireless mesh network up into groups, beam scanning of each of the groups can be simultaneously performed. The breaking up of the wireless mesh network up into groups provides for more efficient selection of the beamforming patterns of each of the transmitting and receiving nodes.

A controller 650 is interfaced with all of the nodes of the wireless mesh network, and can operate to perform the group selections. Further, once the groups selections have been made, the controller 650 can operate to identify the aggressor and victim links within each group, manage the beam scanning (at both the aggressor transmitting nodes and the victim receiving nodes) with the groups of nodes, and select the beamforming coefficients for the selected beamforming patterns.

As shown, the first group of nodes 612 includes nodes 621-628 which include exemplary aggressor links 633, 634, victim links 631, 632, and interference 660, 662, and the second group 614 includes nodes 671-678 which include exemplary aggressor links 633, 634, victim links 631, 632, and interference 660, 662.

Coordinated Beamforming of Aggressor Transmit Node

Figure 7:
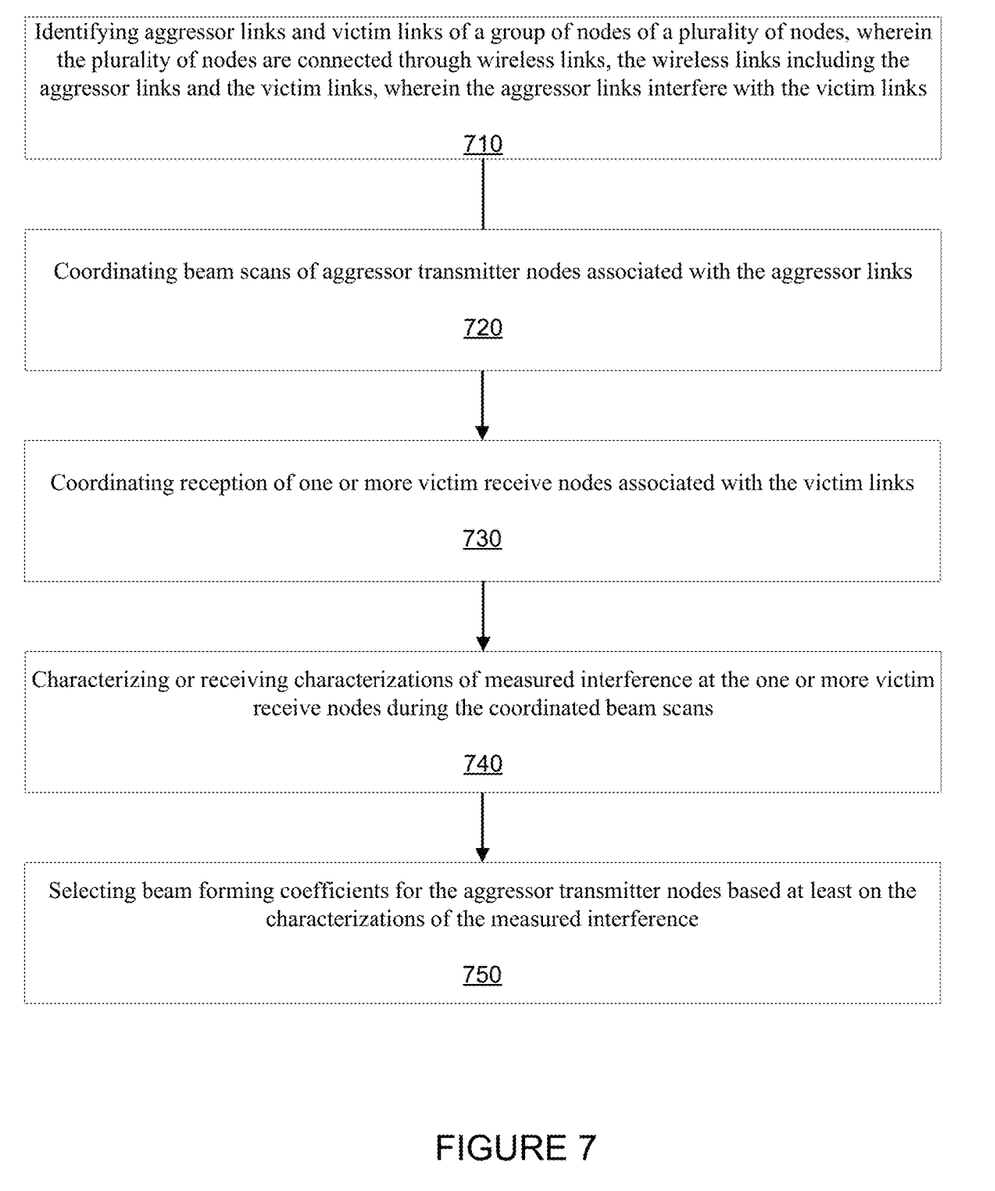
FIG. 7 is a flow chart that includes steps of a method for coordinated beamforming of an aggressor transmit node of a wireless mesh network, according to an embodiment.

FIG. 7 is a flow chart that includes steps of a method for coordinated beamforming of an aggressor transmit node of a wireless mesh network, according to an embodiment. A first step 710 includes identifying aggressor links and victim links of a group of nodes of a plurality of nodes, wherein the plurality of nodes are connected through wireless links, the wireless links including the aggressor links and the victim links, wherein the aggressor links interfere with the victim links. A second step 720 includes coordinating beam scans of aggressor transmitter nodes associated with the aggressor links. A third step 730 includes coordinating reception of one or more victim receive nodes associated with the victim links. A fourth step 740 includes characterizing or receiving characterizations of measured interference at the one or more victim receive nodes during the coordinated beam scans. A fifth step 750 includes selecting beamforming coefficients for the aggressor transmitter nodes based at least on the characterizations of the measured interference.

At least some embodiments include the one or more victim receive nodes measuring an interference-to-noise ratio (INR) while one of the aggressor transmitter nodes is scanning through a set of beams, wherein a signal to noise plus interference ratio (SINR) is determined based on the interference-to-noise ratio (INR). That is, the SNR can be separately determined, and then the SINR determined based on the INR and the SNR.

As previously described, for an embodiment, an interference measurement scan indicates the victim link is subject to interference power from the aggressor link (INR) above a threshold. For at least some embodiments, the INR estimate is based on an aggressor nodes maximum transmit power, average transmit power, or a certain percentile; where statistics are derived from real data collected historically, or result of modelling network dynamics of power control based on cross-link coupling as measured during interference measurement scans and coordinated beamforming scans as described.

For at least some embodiments, the one or more victim receive nodes includes a plurality of victim receive nodes. Further, the beamforming settings of the aggressor transmit node influences the INR of each of the multiple victim receive nodes. A first selected beamforming pattern of the aggressor transmit node may be acceptable (better than a desired or require threshold) for mitigating interference (INR) of a first victim receive node, but may be unacceptable for a second victim receive node. Accordingly, for at least some embodiments, the beamforming pattern selected for the aggressor transmit node is based on measurements from multiple victim receive nodes. For an embodiment, the beamforming pattern selected for the aggressor transmit node is based on minimizing (or reducing) a maximum INR across the multiple victim links of the plurality of victim receive nodes. For an embodiment, the beamforming pattern selected for the aggressor transmit node is based on minimizing (or reducing) an average INR across the multiple victim links of the plurality of victim receive nodes. For an embodiment, the beamforming pattern selected for the aggressor transmit node is based on minimizing (or reducing) an ordered (weighted) ranking of INR across the multiple victim links of the plurality of victim receive nodes. That is, the victim links can be weighted by a perceived importance of the victim link. For example, links that support the largest number of nodes may be ranked, and therefore, weighted higher. The beamforming pattern selected for the aggressor transmit node may be selected based on (reducing or minimizing) a weighted summation of the INR(s) of the multiple victim links, wherein the weight of each victim link is based on the importance of the victim link.

At least some embodiments include coordinating transmission by a victim transmit node while one of the aggressor transmitter nodes is scanning, wherein the one or more victim receive nodes measures a signal to noise plus interference ratio (SINR). That is, the victim transmit node transmits wireless signals to the one or more victim receive nodes while the aggressor transmit node is scanning and transmitting.

At least some embodiments include coordinating transmission coordinate transmission by a plurality of victim transmit node while one of the aggressor transmitter nodes is scanning, wherein the one or more victim receive nodes measures a signal to noise plus interference ratio (SINR). That is, the plurality of victim transmit nodes transmits wireless signals to the one or more victim receive nodes while the aggressor transmit node is scanning and transmitting.

At least some embodiments include identifying where nulls in beamforming patterns formed by one or more of the aggressor transmitter nodes should be located. The beamforming coefficients for the aggressor transmitter nodes are then selected based on the locations of the identified nulls in the beamforming patterns. For example, the beamforming coefficients selected for selectively scaling and/or delaying signals for certain antenna elements to suppress the array response in the direction of interference at either the transmitter or receiver (that is, create a "null" in the array response).

For at least some embodiments, the beamforming coefficients for the aggressor transmitter nodes are selected based on a measured SINR of the one or more victim receive nodes. For at least some embodiments, the beamforming coefficients for the aggressor transmitter nodes are further selected based on a measured SNR of one or more aggressor receive nodes. For at least some embodiments, the beamforming coefficients for the aggressor transmitter nodes are further selected based on a measured SINR of the one or more victim receive nodes and a measured SNR of one or more aggressor receive nodes.

At least some embodiments include characterizing interference between nodes of different groups of nodes. As previously described, for an embodiment, the different groups are selected to allow different groups to be simultaneously characterized at the same time. At least some embodiments include running multiple scans of beamforming patterns of the multiple groups in parallel without impacting each other in order to complete the scanning process faster. An embodiment includes sequentially picking a group to perform a scan on, and then another group that does not contain any nodes within a certain distance of the first group, or based on estimated interference between the groups. An embodiment includes running scans on groups A and B that do not interfere with each other, then running scans on groups C and D, where C and/or D may interfere with groups A and/or B, but do not interfere with each other. Nodes in group C may also be nodes in group A. The beamforming pattern characterization procedures can run periodically (which requires more resources), or can be triggered by a central controller. The central controller may decide to trigger scans based on the occurrence of certain events, like interference exceeding a threshold, or degradation in performance metrics that indicate there may be interference in the network (increased packet loss, links operating at lower data rates, higher latency, more retransmissions, etc.). At least some embodiments include ordering the groups of characterization. The group ordering may be selected by the strongest interference to least interference, where 'strongest' interference is defined as interfering with the largest number of nodes, or based on the highest INR to a single node, or based on a weighting between the two.

At least some embodiments further include coordinating beam scans of the one or more victim receive nodes, coordinate transmission of one or more aggressor transmit nodes, characterize or receive characterizations of measured interference at the one or more victim receive nodes during the coordinated transmission, and select beamforming coefficients for the aggressor transmitter nodes based at least on the characterizations of the measured interference.

As described, beamforming scans can be coordinated at either an aggressor transmit node or at a victim receive node. It is to be appreciated that selecting a beamforming pattern for an aggressor transmit node may have an impact on multiple victim receive nodes. Further, the selection of a beamforming pattern at a victim receive node may allow for a change in an original (prior) beamforming pattern selection at an aggressor transmit node. That is, the selected beamforming pattern of the victim receive node (first victim receive node) may provide enough interference suppression from the aggressor transmit node, that the selected beamforming pattern of the aggressor transmit node can be adjusted to provide more interference suppression of another (a second) victim receive node. Wireless mesh networks are interconnected so that a selection in favor of one node may have an impact (negative or positive) at another node. Accordingly, the beamforming pattern selections at either aggressor transmit nodes or victim receive nodes have implications on other nodes of the wireless mesh network. Accordingly, at least some embodiments include iteratively performing beamforming pattern selections at one or more aggressor transmit nodes and/or at one or more victim receive nodes. For at least some embodiments, results of the beamforming pattern selections are collected. The results of the collected beamforming pattern selections can be evaluated, and a determination of which of the selected beamforming pattern to use can be made.

At least some embodiments further include sensing a network condition, and initiating the coordinated beam scans of aggressor transmitter nodes and the coordinated reception of the one or more victim receive nodes based on the sensed network condition. As previously described, for an embodiment, the different groups are selected to allow different groups to be simultaneously characterized at the same time. At least some embodiments include running multiple scans of beamforming patterns of the multiple groups in parallel without impacting each other in order to complete the scanning process faster.

At least some embodiments further include periodically initiating the coordinated beam scans of aggressor transmitter nodes and the coordinated reception of the one or more victim receive nodes. That is, the beamforming pattern characterization procedures can run periodically (which requires more resources), rather than being triggered by a central controller upon sensing a network condition.

At least some embodiments further include aggregating information from multiple scans from different groups of transmit aggressor nodes and receive victim nodes, order results, and then apply new selected beamforming coefficients. For an embodiment, the ordering is based upon a level of interference a group cause with other groups. For an embodiment, the level of interference is measured as a detected or measured value of interference. For an embodiment, the level of interference is determined by a number of other groups that are interfered with by a group.

At least some embodiments further include sequentially performing scans of beamforming patterns across different groups and applying most recently selected beam patterns after each scan. Each subsequent scan is influenced by the beamforming pattern selections generated by the previous scans.

At least some embodiments include sequentially performing scans across different sets of aggressor transmit nodes, and applying selected beamforming coefficients after each scan, wherein application of the selected beamforming coefficients influences the selection of future beamforming coefficients of aggressor transmit nodes. It is to be appreciated that each time beamforming coefficients are selected for a node it is possible that beamforming coefficient selected by other nodes will be influenced.

Coordinated Beamforming of Victim Receive Node

Figure 8:
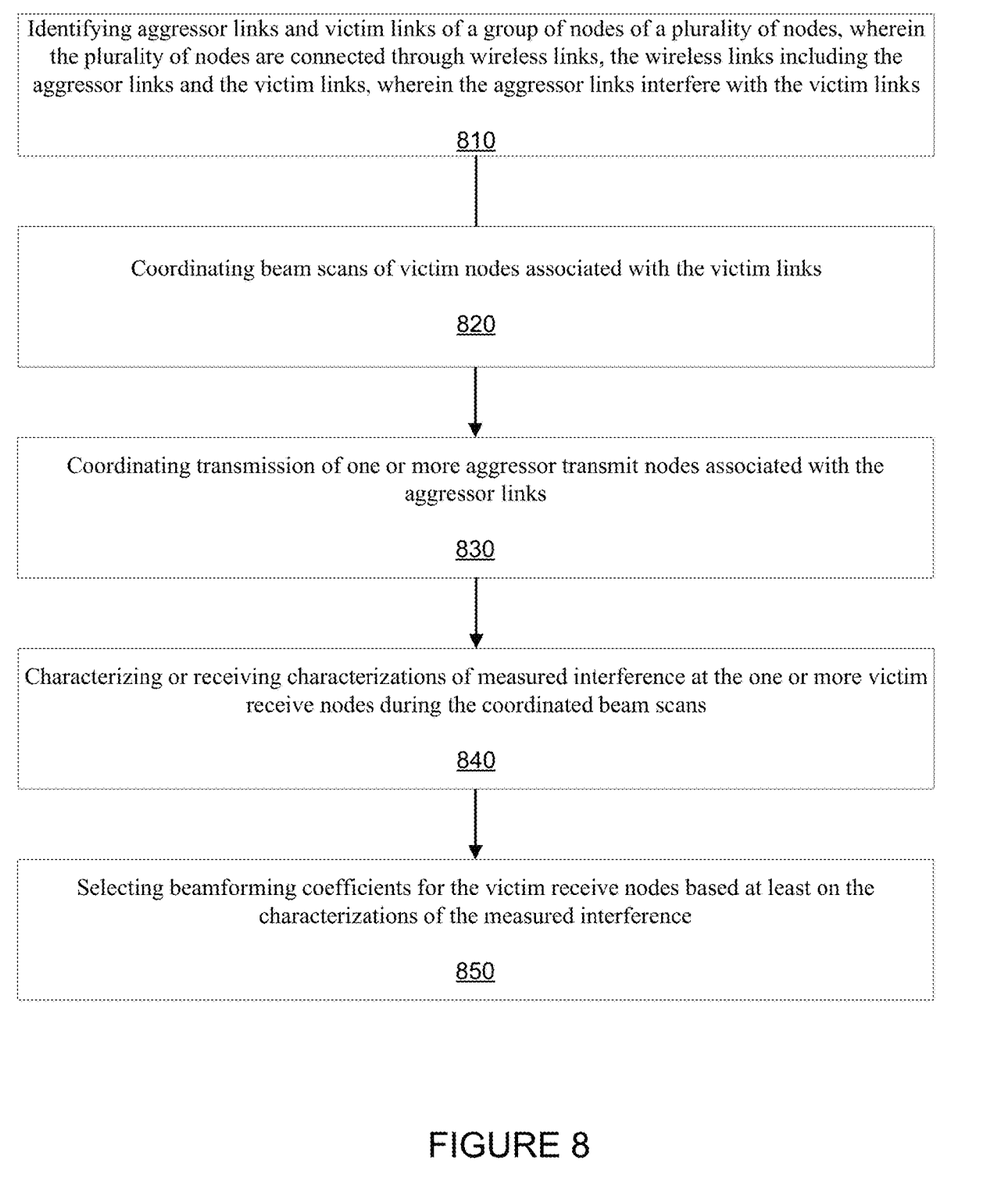
FIG. 8 is a flow chart that includes steps of a method for coordinated beamforming of a victim receive node of a wireless mesh network, according to another embodiment.

FIG. 8 is a flow chart that includes steps of a method for coordinated beamforming of a victim receive node of a wireless mesh network, according to another embodiment. A first step 810 includes identifying aggressor links and victim links of a group of nodes of a plurality of nodes, wherein the plurality of nodes are connected through wireless links, the wireless links including the aggressor links and the victim links, wherein the aggressor links interfere with the victim links. A second step 820 includes coordinating beam scans of victim nodes associated with the victim links. A third step 830 includes coordinating transmission of one or more aggressor transmit nodes associated with the aggressor links. A fourth step 840 includes characterizing or receiving characterizations of measured interference at the one or more victim receive nodes during the coordinated beam scans. A fifth step 850 includes selecting beamforming coefficients for the victim receive nodes based at least on the characterizations of the measured interference.

At least some embodiments further include the one or more victim receive nodes measuring an interference-to-noise ratio (INR) while the one of the one or more victim receive nodes is scanning through a set of beams, and wherein a signal to noise plus interference ratio (SINR) is determined based on the interference-to-noise ratio (INR). At least some embodiments further include coordinating transmission by a victim transmit node while the one or more victim receive nodes is scanning, wherein the one or more victim receive nodes measures a signal to noise plus interference ratio (SINR). At least some embodiments further include coordinating transmission by a plurality of victim transmit nodes while the one or more victim receive nodes is scanning, wherein the one or more victim receive nodes measures a signal to noise plus interference ratio (SINR).

At least some embodiments further include identifying where nulls in beamforming patterns formed by the one or more victim receive nodes should be located, wherein beamforming coefficients for the one or more victim receive nodes are further selected based on the locations of the identified nulls in the beamforming patterns. For example, the beamforming coefficients selected for selectively scaling and/or delaying signals for certain antenna elements to suppress the array response in the direction of interference at either the transmitter or receiver (that is, create a "null" in the array response).

At least some embodiments further include selecting a single one of the victim links of the group having a victim transmit node and a victim receive node, coordinating simultaneous transmission by a plurality of aggressor transmitting nodes and the victim transmit node while victim receive node is scanning, wherein the victim receive node measures a signal to noise plus interference ratio (SINR) during the scanning. For an embodiment, the aggressor transmit nodes operate with beams (main lobes) directed to the corresponding aggressor receive nodes as they would during normal operation. For an embodiment, the aggressor transmit nodes operate with beams directed towards the victim receive node which maximized the amount of interference during the scanning of the beamforming patterns of the victim receive node. For an embodiment, the aggressor transmitting nodes transmit signals at a specified power level.

At least some embodiments further include selecting a single one of the victim links of the group having a victim transmit node and a victim receive node, and coordinating transmission by a plurality of aggressor transmit nodes and the victim transmit node. For an embodiment, coordinating transmission by a plurality of aggressor transmit nodes and the victim transmit node includes one of the plurality of aggressor transmit nodes and the victim transmit node transmitting at a time, coordinating scanning by the victim receive node, including the victim receive node scanning for each of the coordinated transmission of the plurality of aggressor transmit nodes and the victim transmit node, wherein the victim receive node measures a SNR while the while the victim transmit node is transmitting, and wherein the victim receive node measures an INR while each of the aggressor transmit nodes are transmitting. An embodiment further includes approximating an SINR based on the SNR and INR measurements and a transmission power level of each of the plurality of aggressor transmit nodes and the victim transmit node. The SNR and INR measurements are made at the victim receiving node while the victim receiving node is scanning through the beamforming patterns. INR measurements are made when each of the aggressor transmit nodes are transmitting, and the SNR measurement is made with the victim transmit node is transmitting. The result is the SNR measurement for the victim link, and the INR measurement for each aggressor link. The SNR measurement and INR measurements can be used to compute an estimate of SINR for a given set of TX powers of signal transmitted from the victim transmit node and the aggressor transmit nodes.

At least some embodiments further include coordinating beam scans of the one or more aggressor transmit nodes, coordinating reception of one or more victim receive nodes, characterize or receive characterizations of measured interference at the one or more victim receive nodes during the coordinated transmission, and select beamforming coefficients for the victim receive nodes additionally based at least on the characterizations of the measured interference. The characterization and selection of beamforming patterns at the aggressor transmit nodes can influence the selections of the beamforming patterns at the victim receive nodes. That is, each time a beamforming pattern selection is made, other beamforming pattern selections can be affected. Accordingly, a beamforming pattern selection at an aggressor transmit node can allow for a better beamforming pattern selection to be made at a victim receive node.

At least some embodiments further include sensing a network condition, and initiating the coordinated beam scans of victim receive nodes and the coordinated transmission of the one or more aggressor transmit nodes based on the sensed network condition.

At least some embodiments further include periodically initiating the coordinated beam scans of the one or more victim receive nodes and the coordinated transmission of the one or more aggressor transmit nodes. At least some embodiments further include aggregating information from multiple scans from different groups of transmit aggressor nodes and receive victim nodes, order results, and then apply new selected beamforming coefficients.

At least some embodiments further include sequentially performing scans across different sets of victim receive nodes, and apply selected beamforming coefficients after each scan, wherein application of the selected beamforming coefficients influences selection of future beamforming coefficients of victim receive nodes.

Methods for Generating Beamforming Patterns

As described, beam scans of aggressor transmit nodes or victim receive nodes include switching through beamforming patterns at one or more of the aggressor transmit nodes or at one or more of the victim receive nodes. That is, coordinating beam scans of aggressor transmitter nodes associated with the aggressor links includes switching through multiple beamforming patterns at the aggressor transmitter nodes while the aggressor transmitter nodes are transmitting. Further, coordinating beam scans of victim receive nodes associated with the victim links includes switching through multiple beamforming patterns at the victim receive nodes while the victim receive nodes are receiving.

FIG. 9 shows an antenna array 901 for a transmitting node, an antenna array 902 for a receiving node, and further shows M phase shifters 910, 920, 911, 921 associated with each of the antenna elements Ant1-AntM of the antenna arrays 901, 902, according to an embodiment. While the antenna arrays 901, 902 are depicted as both having M antenna elements, it is to be realized that this is merely an example, and each of the antenna arrays 901, 902 can have any number of a plurality of antenna elements. While the arrangement of antenna elements of FIG. 9 is one dimensional, it is to be understood that the described embodiments include additional dimensions, such as, a two or three grid arrangement, or any other arbitrary antenna element arrangement.

A first embodiment for switching through the beam forming patterns includes adjusting least significant bits (LSBs) of one or more phase shifters 910, 920, 911, 921, wherein the phase shifters 910, 920, 911, 921 influence the formation of the different beamforming patterns. That is, for an embodiment, a beamforming pattern (main lobe 950 and side lobes 960, 970 for the antenna array 201, and main lobe 951 and side lobes 961, 971 of the antenna array 902) is formed by a node (transmitting node or receiving node) by the plurality of antennas (antenna arrays 901, 902) of the node. For an embodiment, the different beamforming patterns are formed by selecting or adjusting a phase and/or amplitude of signals being communicated through each of the plurality of antennas. For at least some embodiments, the phase adjusting is performed by the digital phase shifters (910, 920, 911, 921) that includes N bits of resolution.

For a large number of antennas within an antenna array (the plurality of antennas), and a high-resolution phase shifter (large number of bits), the number of possible different beamforming patterns can be very large. For example, for a 32 element (32 antennas) antenna array, wherein each digital phase shifter associated with each of the antenna element includes 6 bits of phase resolution, there are $(2^6)^{32}$ beamforming patterns, which is far too many to practically test. Therefore, at least some embodiments include methods for strategically determining which of the large number of possible beamforming patterns to scan through when selecting a beamforming pattern.

At least some embodiments include recognizing that the most significant bits (MSBs) generally influence the direction of the main lobe of a beamforming pattern and the least significant bits (LSBs) influence the direction and characteristics of the side lobes of the beamforming patterns. For example, for an embodiment, with 6 bits of phase resolution, the most significant bits have the biggest impact on the main lobe gain and direction, whereas the least significant bits have the most impact on the sidelobes. Accordingly, at least some embodiments include switching through the LSBs of the settings of the phase shifters when scanning through the beamforming patterns of the aggressor transmit node and/or the beamforming patterns of the victim receive node. That is, at least some embodiments include modifying the LSBs of the phase shifters to change sidelobe location and gain without impacting the main lobe gain/direction too much. The direction of the main lobe of the beamforming patterns can be selected for providing a desired link connection (having a desired level of connection performance) between the aggressor transmit node and the aggressor receive node of the aggressor link, or between the victim transmit node or the victim receive node of the victim link. The LSBs can then be adjusted to mitigate interference between the links.

However, even toggling a single bit in each of the 32 elements results in $2^{32} > 4$ billion patterns. To generate a smaller set of patterns to measure, at least some embodiments include grouping sets of consecutive elements together into groups and applying the same phase rotation to each element in the group. For at least some embodiments, different patterns are generated by selecting different combinations of the groups for which to rotate the phase. For example, 32 elements can be divided into 8 groups of 4 consecutive elements, resulting in 256 combinations of groups. For example, pattern '10000001' means rotate the phase for all elements in the first and last group of four elements by 45 degrees.

An embodiment for selecting the beamforming patterns includes a response cancellation. In order to suppress an array response of the beamforming patterns in a specific known direction (to reduce coupling with a link in the specific known direction) without degrading the main lobe too much (that is, without suppressing the connectivity with the intended node), the geometric beam in the direction of the desired signal can be combined with a scaled version of the geometric beam in the direction of the interference by taking an element by element complex sum and then quantizing each complex value to unit magnitude. However, due to non-idealities, the scaling factor can't be determined ahead of time. Instead, for at least some embodiments, a set of patterns is generated for a set of possible scaling values (gamma), such that array response is suppressed in the direction of interference for a least one of the scaling values. For an embodiment, the number of scaling values (gamma) is chosen based on the desired number of beamforming patterns.

Assuming N antenna elements, a geometric beamforming pattern in the direction of the desired signal given by ws(n), a geometric beamforming pattern in the direction of the interferer wn(n), and a complex scaling factor of gamma, for at least some embodiments, the set of new patterns is given by:

$$w(n)=ws(n)+gamma*wn(n), \text{ for } n=1:N,$$

where if only per-element phase control is possible, the phase of each element is given by phase(n)=phase(w(n)).

Although specific embodiments have been described and illustrated, the embodiments are not to be limited to the specific forms or arrangements of parts so described and illustrated. The described embodiments are to only be limited by the claims.

What is claimed:

1. A wireless network, comprising:
   a plurality of nodes connected through wireless links, the wireless links including aggressor links and victim links, wherein the aggressor links interfere with the victim links;
   a controller operative to:
   identify aggressor links and victim links of a group of nodes of the plurality of nodes;
   coordinate transmit beam scans of aggressor transmitter nodes associated with the aggressor links;
   coordinate reception of one or more victim receive nodes associated with the victim links during the coordinated transmit beam scans;
   coordinate receive beam scans of the one or more victim receive nodes associated with the victim links of the group;
   coordinate transmission of one or more aggressor transmit nodes associated with the aggressor links of the group during the coordinated receive beam scans;
   characterize or receive characterizations of measured interference at the one or more victim receive nodes during the coordinated transmit beam scans and during the coordinated receive beam scans; and
   select beamforming coefficients for the aggressor transmit nodes and the victim receive nodes based at least on the characterizations of the measured interference.

2. The wireless network of claim 1, further comprising the one or more victim receive nodes measuring an interference-to-noise ratio (INR) while one of the aggressor transmit nodes is scanning through a set of transmit beams, and while the one or more victim receive nodes is scanning through a set of receive beams, and wherein a signal to noise plus interference ratio (SINR) is determined based on the interference-to-noise ratio.

3. The wireless network of claim 1, wherein the controller further operates to:
   coordinate transmission by a victim transmit node while the one or more victim receive nodes is scanning; and
   wherein the one or more victim receive nodes measures a signal to noise plus interference ratio (SINR).

4. The wireless network of claim 1, wherein the controller further operates to:
   coordinate transmission by a plurality of victim transmit nodes while the one or more victim receive nodes is scanning; and
   wherein the one or more victim receive nodes measures a signal to noise plus interference ratio (SINR).

5. The wireless network of claim 1, wherein the controller further operates to:
   identify where nulls in beamforming patterns formed by one or more of the aggressor transmitter nodes should be located;
   wherein beamforming coefficients for the aggressor transmitter nodes are further selected based on locations of the identified nulls in the beamforming patterns;
   identify where nulls in beamforming patterns formed by the one or more victim receive nodes should be located; and
   wherein beamforming coefficients for the one or more victim receive nodes are further selected based on the locations of the identified nulls in the beamforming patterns.

6. The wireless network of claim 1, wherein beamforming coefficients for the aggressor transmitter nodes are selected based on a measured signal to noise plus interference ratio (SINR) of the one or more victim receive nodes, and wherein beamforming coefficients for the one or more victim receive nodes are selected based on a measured SINR of the one or more victim receive nodes.

7. The wireless network of claim 1, wherein the controller further operates to:
   select a single one of the victim links of the group having a victim transmit node and a victim receive node;
   coordinate simultaneous transmission by a plurality of aggressor transmitting nodes and the victim transmit node while the victim receive node is scanning;
   wherein the victim receive node measures a signal to noise plus interference ratio (SINR) during the scanning.

8. The wireless network of claim 1, wherein the controller further operates to:
   select a single one of the victim links of the group having a victim transmit node and a victim receive node;
   coordinate transmission by a plurality of aggressor transmit nodes and the victim transmit node, comprising one of the plurality of aggressor transmit nodes and the victim transmit node transmitting at a time;
   coordinate scanning by the victim receive node, comprising the victim receive node scanning for the coordinated transmission of the plurality of aggressor transmit nodes and the victim transmit node;
   wherein the victim receive node measures a SNR while the victim transmit node is transmitting; and
   wherein the victim receive node measures an interference-to-noise ratio (INR) while the aggressor transmit nodes are transmitting.

9. The wireless network of claim 8, wherein the controller further operates to:
approximate an SINR based on the SNR and INR measurements and a transmission power level of the plurality of aggressor transmit nodes and the victim transmit node.

10. The wireless network of claim 1, wherein the controller is further operative to: characterize interference between nodes of different groups of nodes.

11. The wireless network of claim 1, wherein the controller is further operative to:
sense a network condition; and
initiate the coordinated beam scans of the one or more victim receive nodes and the coordinated transmission of the one or more aggressor transmit nodes based on the sensed network condition.

12. The wireless network of claim 1, wherein the controller is further operative to periodically initiate the coordinated beam scans of the one or more victim receive nodes and the coordinated transmission of the one or more aggressor transmit nodes.

13. The wireless network of claim 1, wherein the controller is further operative to aggregate information from multiple scans from different groups of transmit aggressor nodes and receive victim nodes, order results, and then apply new selected beamforming coefficients.

14. The wireless network of claim 1, wherein the controller is further operative to:
sequentially perform scans across different sets of victim receive nodes; and
apply selected beamforming coefficients after the scans, wherein application of the selected beamforming coefficients influences selection of future beamforming coefficients of victim receive nodes.

15. A method, comprising:
identifying aggressor links and victim links of a group of nodes of a plurality of nodes, wherein the plurality of nodes are connected through wireless links, the wireless links including the aggressor links and the victim links, wherein the aggressor links interfere with the victim links;
coordinating transmit beam scans of aggressor transmitter nodes associated with the aggressor links;
coordinating reception of one or more victim receive nodes associated with the victim links during the coordinated transmit beam scans;
coordinating receive beam scans of victim nodes associated with the victim links;
coordinating transmission of one or more aggressor transmit nodes associated with the aggressor links during the coordinated receive beam scans;
characterizing or receiving characterizations of measured interference at the one or more victim receive nodes during the coordinated beam scans; and
selecting beamforming coefficients for the aggressor transmit nodes and the victim receive nodes based at least on the characterizations of the measured interference.

16. The method of claim 15, further comprising:
selecting a single one of the victim links of the group having a victim transmit node and a victim receive node;
coordinating simultaneous transmission by a plurality of aggressor transmitting nodes and the victim transmit node while the victim receive node is scanning;
wherein the victim receive node measures a signal to noise plus interference ratio (SINR) during the scanning.

17. The method of claim 15, further comprising:
selecting a single one of the victim links of the group having a victim transmit node and a victim receive node;
coordinating transmission by a plurality of aggressor transmit nodes and the victim transmit node, comprising one of the plurality of aggressor transmit nodes and the victim transmit node transmitting at a time;
coordinating scanning by the victim receive node, comprising the victim receive node scanning for the coordinated transmission of the plurality of aggressor transmit nodes and the victim transmit node;
wherein the victim receive node measures a SNR while the victim transmit node is transmitting; and
wherein the victim receive node measures an interference-to-noise ratio (INR) while the aggressor transmit nodes are transmitting.

18. The method of claim 15, further comprising:
sequentially performing scans across different sets of victim receive nodes; and
applying selected beamforming coefficients after the scans, wherein application of the selected beamforming coefficients influences selection of future beamforming coefficients of one or more victim receive nodes.

* * * * *